US009892265B1

(12) United States Patent
Tripathy et al.

(10) Patent No.: US 9,892,265 B1
(45) Date of Patent: Feb. 13, 2018

(54) PROTECTING VIRTUAL MACHINE DATA IN CLOUD ENVIRONMENTS

(71) Applicant: Veritas Technologies LLC, Mountain View, CA (US)

(72) Inventors: Soumya Tripathy, West Bengal (IN); Subhadeep Ghosh, West Bengal (IN)

(73) Assignee: Veritas Technologies LLC, Mountain View, CA (US)

( * ) Notice: Subject to any disclaimer, the term of this patent is extended or adjusted under 35 U.S.C. 154(b) by 0 days.

(21) Appl. No.: 14/674,205

(22) Filed: Mar. 31, 2015

(51) Int. Cl.
*H04L 29/06* (2006.01)
*G06F 21/60* (2013.01)
*G06F 9/455* (2006.01)
*G06F 9/44* (2006.01)

(52) U.S. Cl.
CPC .......... *G06F 21/602* (2013.01); *G06F 9/4406* (2013.01); *G06F 9/45533* (2013.01)

(58) Field of Classification Search
None
See application file for complete search history.

(56) References Cited

U.S. PATENT DOCUMENTS

| 7,127,602 | B1* | 10/2006 | Bakke | G06F 9/4416 709/222 |
| 8,892,876 | B1* | 11/2014 | Huang | G06F 21/6218 713/165 |
| 2010/0082991 | A1* | 4/2010 | Baldwin | H04L 9/083 713/176 |
| 2011/0264776 | A1* | 10/2011 | Clerc | G06F 8/63 709/222 |
| 2012/0110328 | A1* | 5/2012 | Pate | G06F 21/6218 713/165 |
| 2012/0173871 | A1* | 7/2012 | Ashok | G06F 21/575 713/153 |
| 2012/0185701 | A1* | 7/2012 | Balinsky | G06F 21/6209 713/193 |
| 2012/0265976 | A1* | 10/2012 | Spiers | H04L 63/0218 713/2 |
| 2013/0173900 | A1* | 7/2013 | Liu | G06F 9/45558 713/2 |
| 2014/0195791 | A1* | 7/2014 | Teli | G06F 11/1417 713/2 |

* cited by examiner

*Primary Examiner* — Dede Zecher
*Assistant Examiner* — Vadim Savenkov
(74) *Attorney, Agent, or Firm* — Campbell Stephenson LLP

(57) ABSTRACT

Various systems, methods, and processes to protect virtual machine data in a cloud environment are disclosed. A request for requested data is received at an encryption virtual machine. The requested data is encrypted, and the encryption virtual machine is configured to receive the request from an application virtual machine via a loader. The requested data includes one or more operating system modules, and the operating system modules are configured to be used by the application virtual machine. The requested data is accessed in a storage volume, which is communicatively coupled to the encryption virtual machine. The requested data is then retrieved from the storage volume and decrypted at the encryption virtual machine. The decrypted data is then sent to the loader.

20 Claims, 12 Drawing Sheets

PROTECTING VIRTUAL MACHINE DATA IN CLOUD ENVIRONMENTS

FIELD OF THE DISCLOSURE

This disclosure relates to data protection and storage and, more particularly, to protecting and storing encrypted virtual machine data in cloud environments.

DESCRIPTION OF THE RELATED ART

Enterprises and businesses store vast amounts of data in the "cloud." A cloud is a data center which provides computing, networking, and storage services with the goal of maximizing the utility and minimizing the consumption of computing resources. Data which is stored in the cloud can contain critical data, and can be (and typically is) stored in a remote location (e.g., in a geographically distant location from a customer). A cloud-based service may be provided by a third-party (hereinafter "provider" or "vendor"). A vendor may employ virtualization technology to create and implement virtual machines in the cloud. In turn, these virtual machines can require (and generate) critical data which needs to be protected from hackers and the like.

Typically, companies which store data in the cloud, rely on the aforementioned vendors to manage the encryption and storage of said data. However, a customer may not be aware (or may not be made aware) if the security infrastructure implemented by a vendor is secure from data breaches, hackers, and the like. Moreover, a vendor may not disclose (to the customer) what measures, if any, have been taken to secure the cloud infrastructure in question from malicious attack.

If there is a data breach or if a storage device in the cloud is hacked, the customer's critical data may be compromised. In some cases, customers may not even become aware their data may have been compromised until it is too late. Therefore, these vendors do not provide adequate protection of and control to their customers over matters pertaining to the encryption and/or storage of their critical data stored in cloud environments.

SUMMARY OF THE DISCLOSURE

Various methods, systems, and processes for storing encrypted virtual machine data in cloud environments are disclosed. One such method involves receiving a request for requested data at an encryption virtual machine. In this example, the requested data is encrypted, the encryption virtual machine is configured to receive the request from an application virtual machine via a loader, the requested data includes one or more operating system modules, and the operating system modules are configured to be used by the application virtual machine.

The method accesses the requested data in a storage volume, which is communicatively coupled to the encryption virtual machine. The requested data is then retrieved from the storage volume and decrypted at the encryption virtual machine. The method then sends the decrypted data to the loader.

In one embodiment, the one or more operating system modules include operating system data. The operating system data is used by the loader to boot the application virtual machine. In this example, the storage volume is not communicatively coupled to the application virtual machine. However, the loader is communicatively coupled to both the application virtual machine and the encryption virtual machine.

In some embodiments, the loader implements a Storage Area Network (SAN) client and the encryption virtual machine implements a SAN target. The SAN client serves the application virtual machine with the decrypted data sent to the loader from the SAN target.

In other embodiments, the method accesses a map file in the encryption virtual machine prior to accessing the requested data in a storage volume. The map file includes an encryption key associated with the application virtual machine and maintains a mapping between the application virtual machine and the encryption key associated with the application virtual machine. The map file also includes the location of the requested data in the storage volume.

In some embodiments, the SAN client uses Internet Small Computer System Interface (iSCSI) protocol to send the request for data to the SAN target and the SAN target uses the iSCSI protocol to send the decrypted data to the SAN client.

In other embodiments, the loader is implemented in a virtual disk. In this example, the loader is a boot loader and the virtual disk is an iPXE disk.

The foregoing is a summary and thus contains, by necessity, simplifications, generalizations, and omissions of detail; consequently those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

Figure 1:
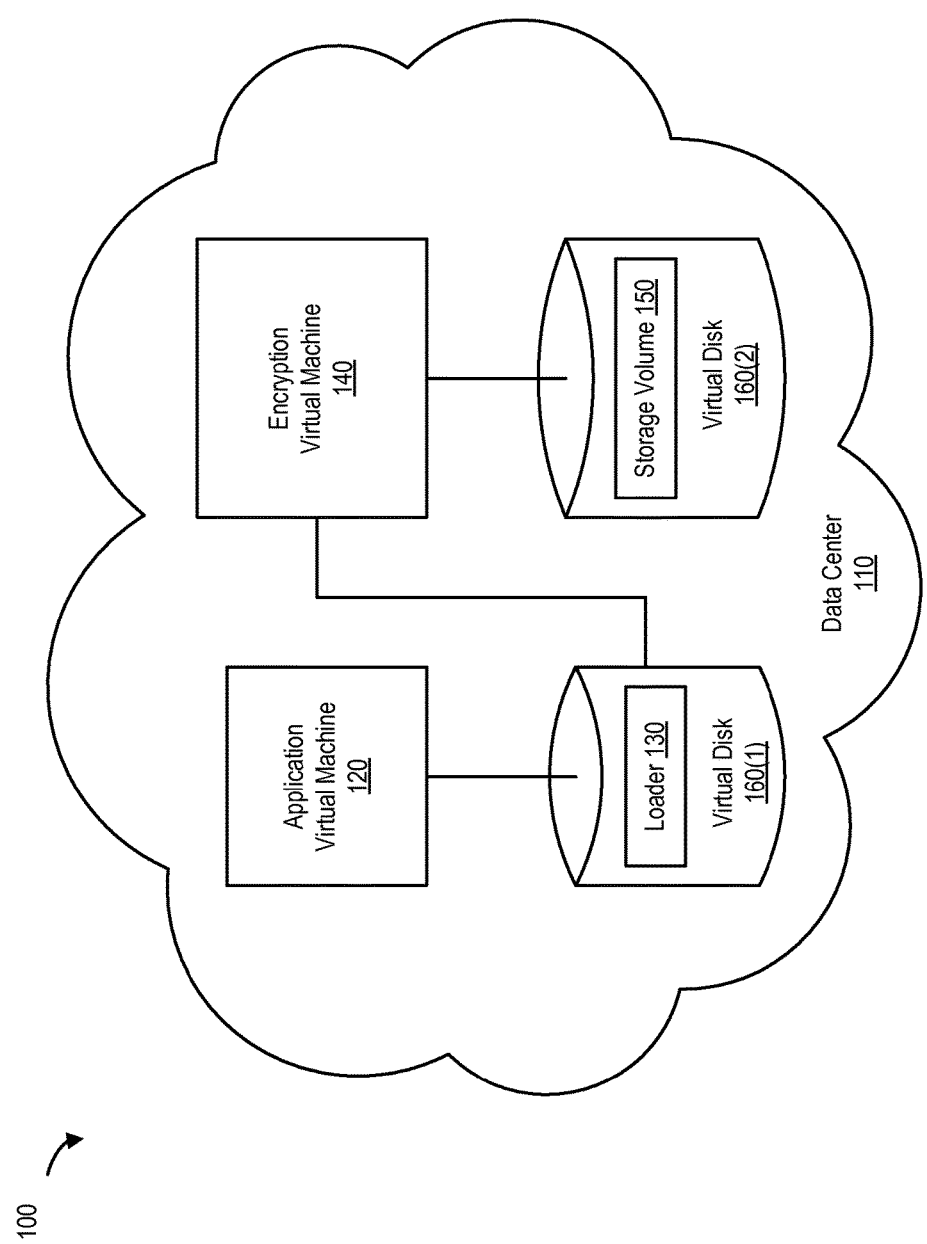
FIG. 1 is a simplified block diagram of a data center in the "cloud," according to one embodiment.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

As noted, enterprises and businesses often use vendors to manage and store their critical data. Such data is typically managed and stored by the vendors in a remote data center. Because a customer's data is managed and stored remotely, often times, the customer may not be aware (or may not be made aware) of the security measures, if any, that may have been implemented by the vendor to prevent and/or mitigate the compromise of critical data due to data breaches, hackers, and the like. In some cases, the customer may not even be aware that critical data may have be compromised until it is too late to take corrective action. Therefore, these vendors may not provide adequate protection of and control to their customers over matters pertaining to the encryption and/or storage of their critical data stored in the cloud.

To address the foregoing problems, some vendors may encrypt their customers' data. However, even having a vendor provide data encryption has its limitations. For example, although one or more storage volumes with a customer's data can be encrypted by a vendor, the vendor typically manages and/or maintains the encryptions key(s) which is/are used to encrypt the customer's data. In addition, a customer may not be able to specify the encryption key and the customer may also not be able to store the encryption key. A hacker can use a stolen encryption key to steal the customer's data without the customer having any knowledge of the data breach and/or control over the compromised data.

As noted, vendors of cloud-related services also use virtualization technology to create and implement virtual machines in a cloud environment (e.g., for their customers). Because a virtual machine is an emulation of a client computer system (hereinafter "client"), the virtual machine may require the operating system (hereinafter "OS") of that client (e.g., in the form of an OS/boot disk) to boot up before it can perform any other computing functions (e.g., like running an application, etc.).

It is generally desirable to encrypt a boot disk that is required to boot a virtual machine. For example, if a boot disk is compromised, it can be significantly easier for a hacker to hack the corresponding data disk associated with the virtual machine with relative ease. Therefore, boot disk encryption provides a strong first line of defense against data theft (e.g., of critical application data in a data disk). However, boot disk encryption of virtual machines in the cloud poses at least three challenges.

First, many vendors simply do not support boot disk encryption. For example, Amazon®, Inc.'s Elastic Block Store (EBS) service only supports data disk encryption, not boot disk encryption.

Second, although PGP Whole Disk Encryption technology provided by Symantec® Corporation of Mountain View, Calif. provides for whole disk encryption, this technology suffers from at least one shortcoming. For example, when a virtual machine is powered on in the cloud, and before the virtual machine starts booting, a user has to enter a password to decrypt the boot disk (e.g., the OS disk) that is being used to provide the OS to the virtual machine. Because the virtual machine is powered on in the cloud, a user cannot enter the password to decrypt the boot disk because he/she will be unable to control (or see) the virtual machine during the boot up process, and thus will be unable to enter the necessary password to decrypt the boot disk. For instance, the user cannot see or access the Basic Input/Output System (BIOS) screen because the virtual machine only comes online in the cloud after the boot up process is complete.

Third, some boot disk encryption methodologies require software components to be installed inside a virtual machine. Consequently, these methodologies (e.g., like Bitlocker for Windows®) are OS aware in the sense that these methodologies are dependent on the features of the particular OS and thus, are not OS agnostic. For instance, encrypting a boot disk using this third scenario would be highly intrusive and resource intensive, and would require agents, drivers, and/or software components to be installed in the particular OS (e.g., code/logic that is specifically designed for the OS of the virtual machine, a hypervisor, etc.).

Therefore, given the foregoing problems, a solution that provides a less intrusive, efficient, and OS agnostic method, system, and/or process of performing boot disk encryption of a virtual machine in the cloud would be beneficial. In addition, providing a customer with control over how the customer's data is encrypted and stored in the cloud would also be advantageous from a data security standpoint.

A Cloud-Based Data Center

FIG. 1 is a simplified block diagram of a data center that is implemented in the cloud, according to one embodiment. Data center 110, which can also be more generally referred to as the "cloud," is a computing system which provides one or more computing services to one or more clients. Such computing services can include, but are not limited to, virtualization, encryption, and storage related services. Data center 110 can be established, managed, implemented, and controlled by one or more vendors and/or providers. In one example, data center 110 can be located at a customer site (e.g., on the customer's premises, or inside the customer's headquarters), or in another example, data center 110 can be located in a remote location that is geographically distant from the customer and the client.

As shown in FIG. 1, data center 110 implements an application virtual machine 120, an encryption virtual machine 140, and two separate virtual disks—virtual disk 160(1) which implements a loader 130, and virtual disk 160(2) which implements a storage volume 150. In one embodiment, loader 130 is a boot loader. For instance, loader 130 can be an open-source implementation of the Preboot Execution Environment (PXE) bootloader. Therefore, if loader 130 is an iPXE bootloader, virtual disk 160(1) can be referred to as an iPXE disk. However, in some embodiments, loader 130 can be any code, logic, or software module that assists one or more virtual machines to boot up using one or more operating systems from another virtual disk (or from a separate physical disk that is associated with a client).

Both virtual disk 160(1) and virtual disk 160(2) can be provided by a storage-virtualization device that is part of a Storage Area Network (SAN) (not shown in FIG. 1). However, because virtual disk 160(1) is not used for data storage, it is contemplated that virtual disk 160(1) will be considerably smaller in size than virtual disk 160(2), at least in some embodiments. On the other hand, virtual disk 160(2) stores one or more storage volumes (e.g., storage volume 150).

Figure 2A:
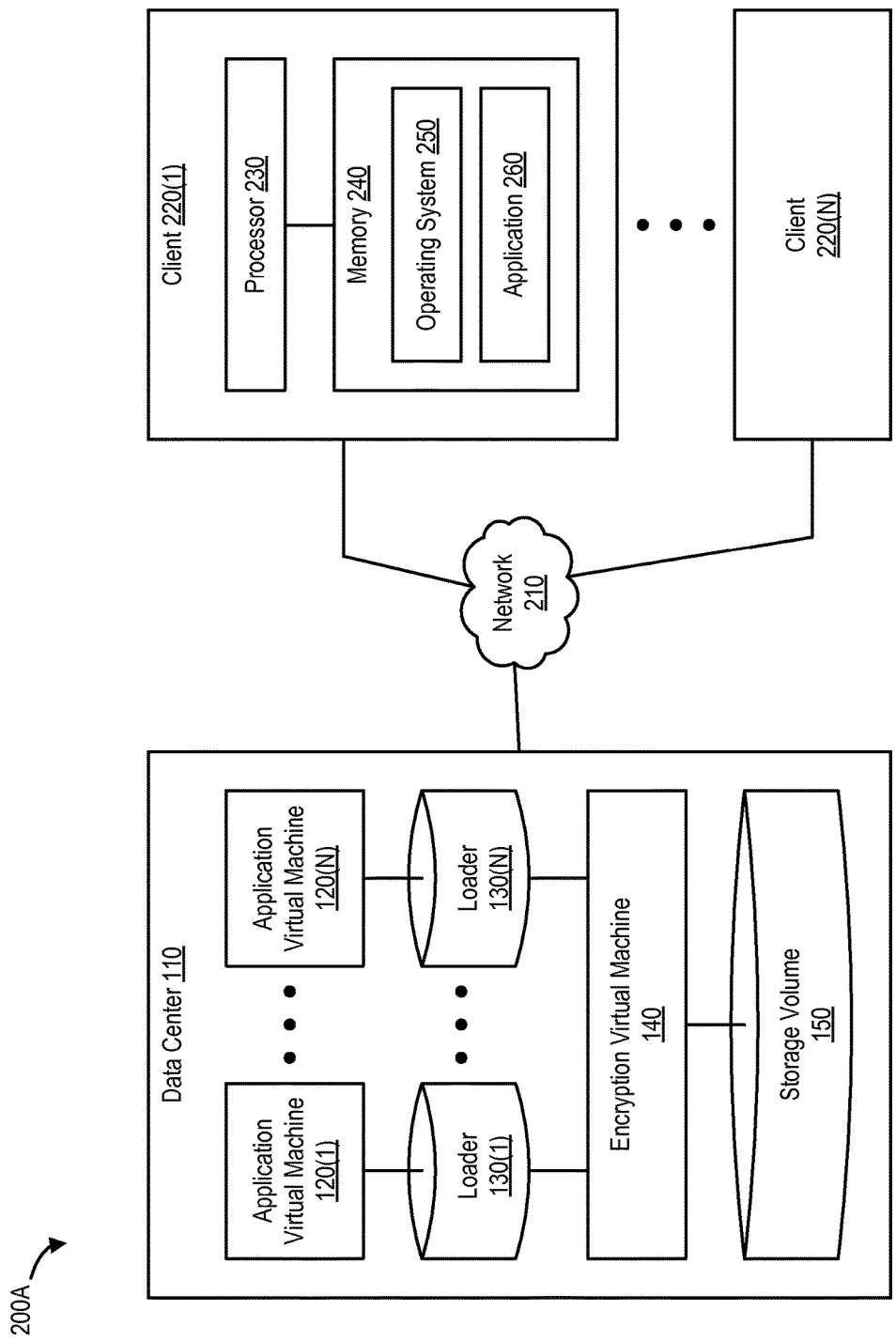
FIG. 2A is a simplified block diagram of a client and a data center, according to one embodiment.

FIG. 2A is a simplified block diagram of a data center (e.g., the cloud) and one or more clients (e.g., one or more customers, or a single customer), according to one embodiment. As shown, FIG. 2A includes clients 220(1)-(N). For example, client 220(1) includes a processor 230 and a memory 240 which includes an operating system 250 and an application 260. Client 220(1) can be any of a variety of different types of computing devices, including a server, personal computing device, laptop computer, net book, personal digital assistant, cellular phone, or the like.

Client 220(1) and data center 110 can be coupled by a local connection (e.g., using a technology such as Bluetooth™, Peripheral Component Interconnect (PCI), Small Computer System Interface (SCSI), or the like), or (as shown in FIG. 2A) via one or more networks 210 such as the Internet or a SAN.

As shown in FIG. 2A, data center 110 can include one or more application virtual machines 120(1)-(N). Also as shown in FIG. 2A, each application virtual machine is communicatively coupled to a separate loader in the data center. However, in some embodiments, one or more application virtual machines can share a single loader, or multiple loaders can be communicatively coupled to a single virtual machine.

Encryption virtual machine 140 is a dedicated virtual machine and is implemented in data center 110. Encryption virtual machine 140 can be created from a snapshot or a backup image provided by client 220(1). Encryption virtual machine 140 is communicatively coupled to loaders 130(1)-(N) and to storage volume 150. In one embodiment, encryption virtual machine 140 can be used to perform data encryption and data decryption of one or more operating systems depending on which OS is required by each of application virtual machines 120(1)-(N). In another embodiment, encryption virtual machine 140 can perform the encryption and decryption of application data served to application virtual machines 120(1)-(N). It should be noted that application virtual machines 120(1)-(N) are only communicatively coupled to their respective loaders 130(1)-(N) and not to encryption virtual machine 140 or to storage volume 150. Therefore, for example, application virtual machine 120(1) is decoupled from its storage source (e.g., storage volume 150).

Figure 2B:
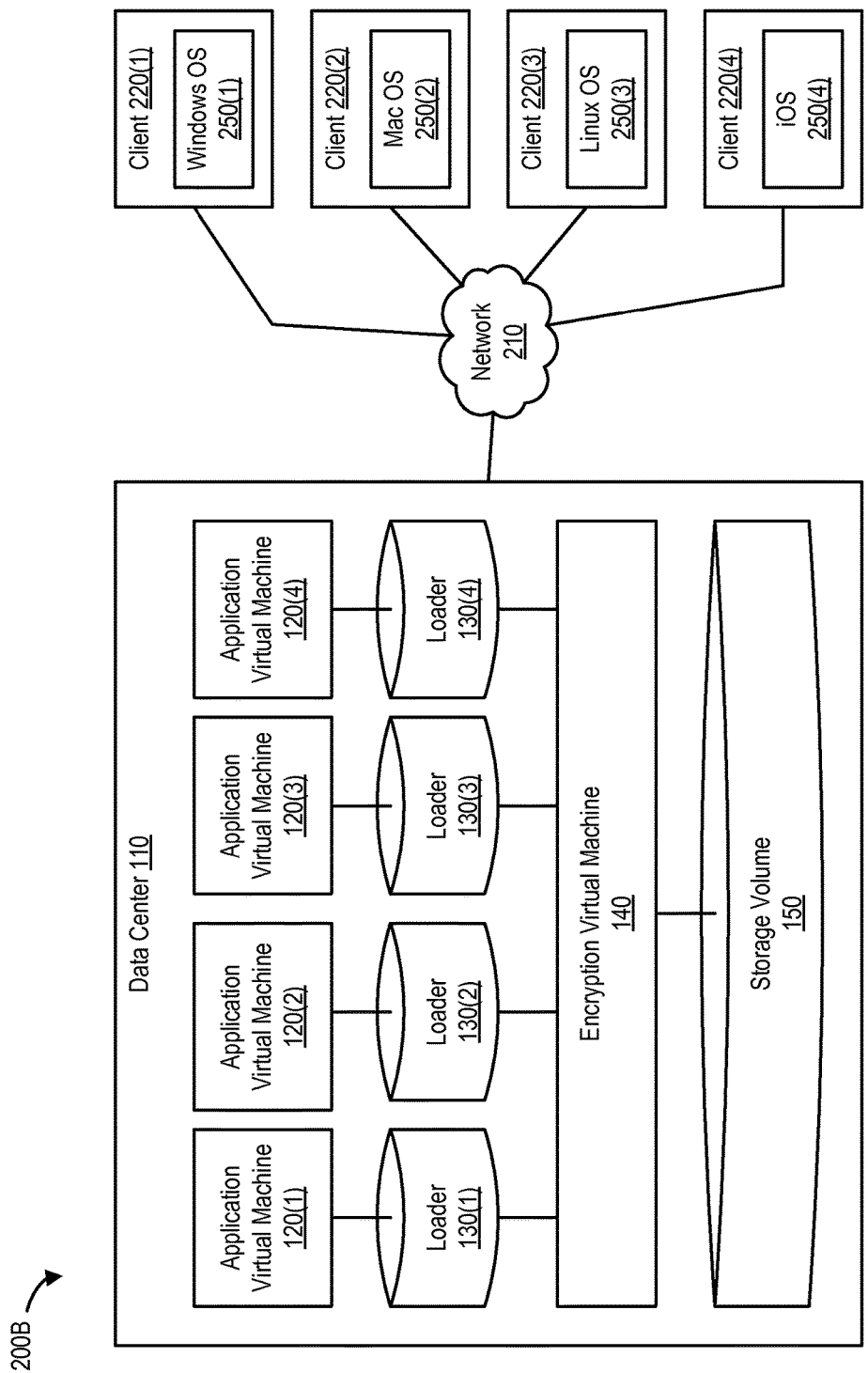
FIG. 2B is a simplified block diagram of one or more application virtual machines that use an encryption virtual machine, according to one embodiment.

FIG. 2B is a simplified block diagram of one or more application virtual machines that use an encryption virtual machine via one or more loaders, according to one embodiment. As shown in FIG. 2B, client 220(1) runs Windows OS 250(1), client 220(2) runs Mac OS 250(2), client 220(3) runs Linux OS 250(3), and client 220(4) runs iOS 250(4). Clients 220(1)-(4) are emulated and virtualized as application virtual machines 120(1)-(4) in data center 110. Therefore, application virtual machine 120(1) requires Windows OS 250(1) to boot up, application virtual machine 120(2) requires Mac OS 250(2) to boot up, application virtual machine 120(3) requires Linux OS 250(3) to boot up, and application virtual machine 120(4) requires iOS 250(4) to boot up respectively.

As shown in FIG. 2B, application virtual machine 120(1) is communicatively coupled to loader 130(1), application virtual machine 120(2) is communicatively coupled to loader 130(2), application virtual machine 120(3) is communicatively coupled to loader 130(3), and application virtual machine 120(4) is communicatively coupled to loader 130(4) respectively. Loaders 130(1)-(4) are communicatively coupled to encryption virtual machine 140, which is communicatively coupled to storage volume 150. In some embodiments, loaders 130(1)-(4) facilitate the booting of application virtual machines 120(1)-(4) with operating systems 250(1)-(4) respectively. In this example, the OS boot disks for operating systems 250(1)-(4) are encrypted and stored in storage volume 150. In one embodiment, loaders 130(1)-(4) use encryption virtual machine 140 to decrypt OS boot disks for operating systems 250(1)-(4) before booting application virtual machines 120(1)-(4).

Using a SAN Client to Request Data and a SAN Target to Send Data

Figure 3A:
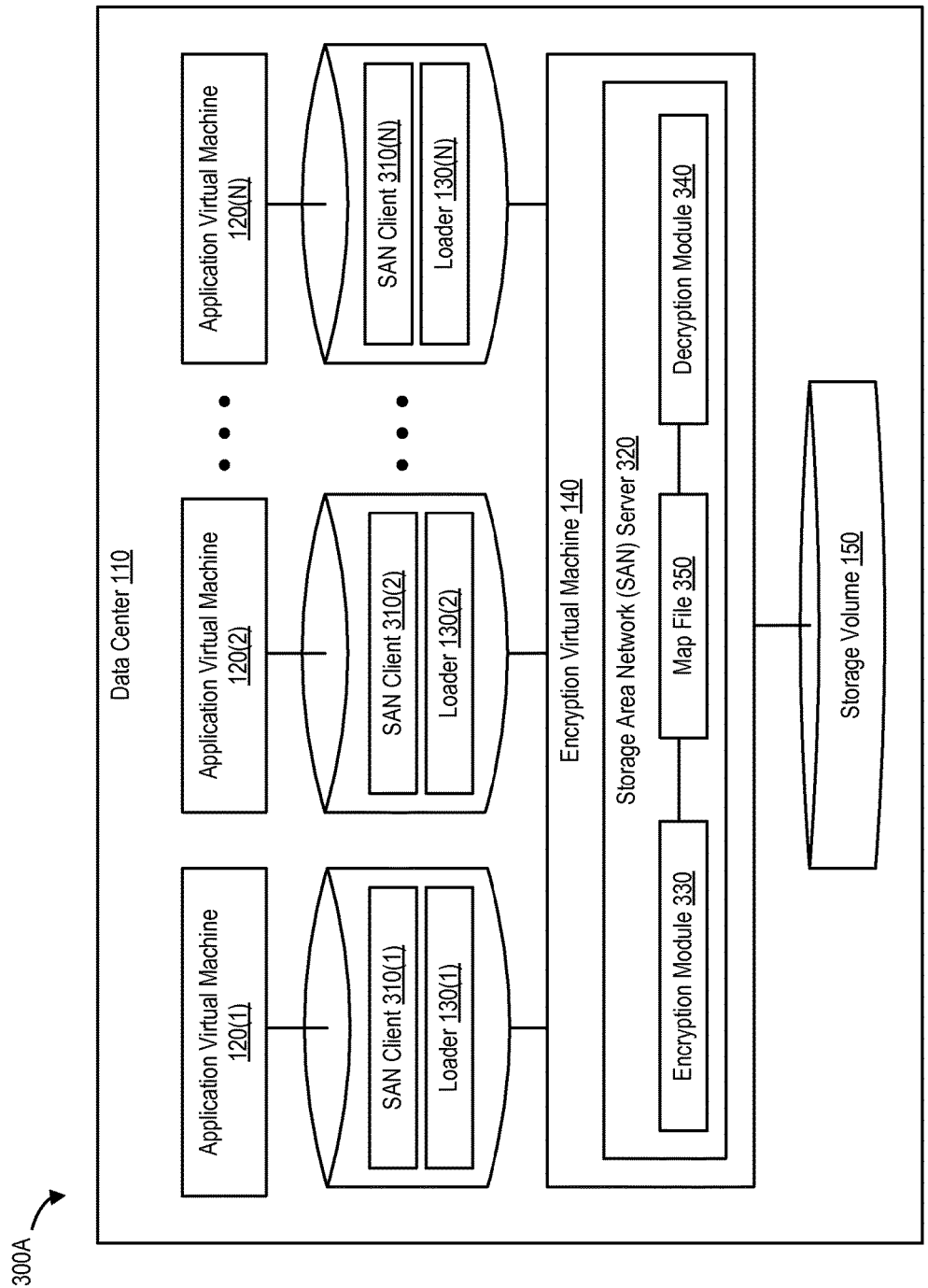
FIG. 3A is a simplified block diagram of one or more loaders implemented in a data center, according to one embodiment.

FIG. 3A is a simplified block diagram that illustrates the implementation of a SAN client in a virtual disk that also implements a loader, according to one embodiment. FIG. 3A also illustrates the implementation of a SAN server (also called a SAN target) in encryption virtual machine 140. If application virtual machine 120(1) needs OS data in a boot disk or application data in an application disk stored in storage volume 150, application virtual machine 120(1) sends a request for the boot disk (e.g., OS data) and/or application disk (e.g., application data) to SAN client 310(1).

In some embodiments, SAN client 310(1) can use an Internet Small Computer System Interface (iSCSI) protocol to send the request from application virtual machine 120(1) for OS data and/or application data to SAN server 320 which is resident on encryption virtual machine 140. Encryption virtual machine 140, via SAN server 320, can then act upon the request from SAN client 310(1) and send the requested data (e.g., OS data or application data) to SAN client 310 using the same iSCSI protocol. It is contemplated that other protocols other than iSCSI can be used for data transmission between SAN clients 310(1)-(N) and SAN server 320 (e.g., a Fiber Channel over Ethernet (FCoE) protocol can be used instead).

Figure 3B:
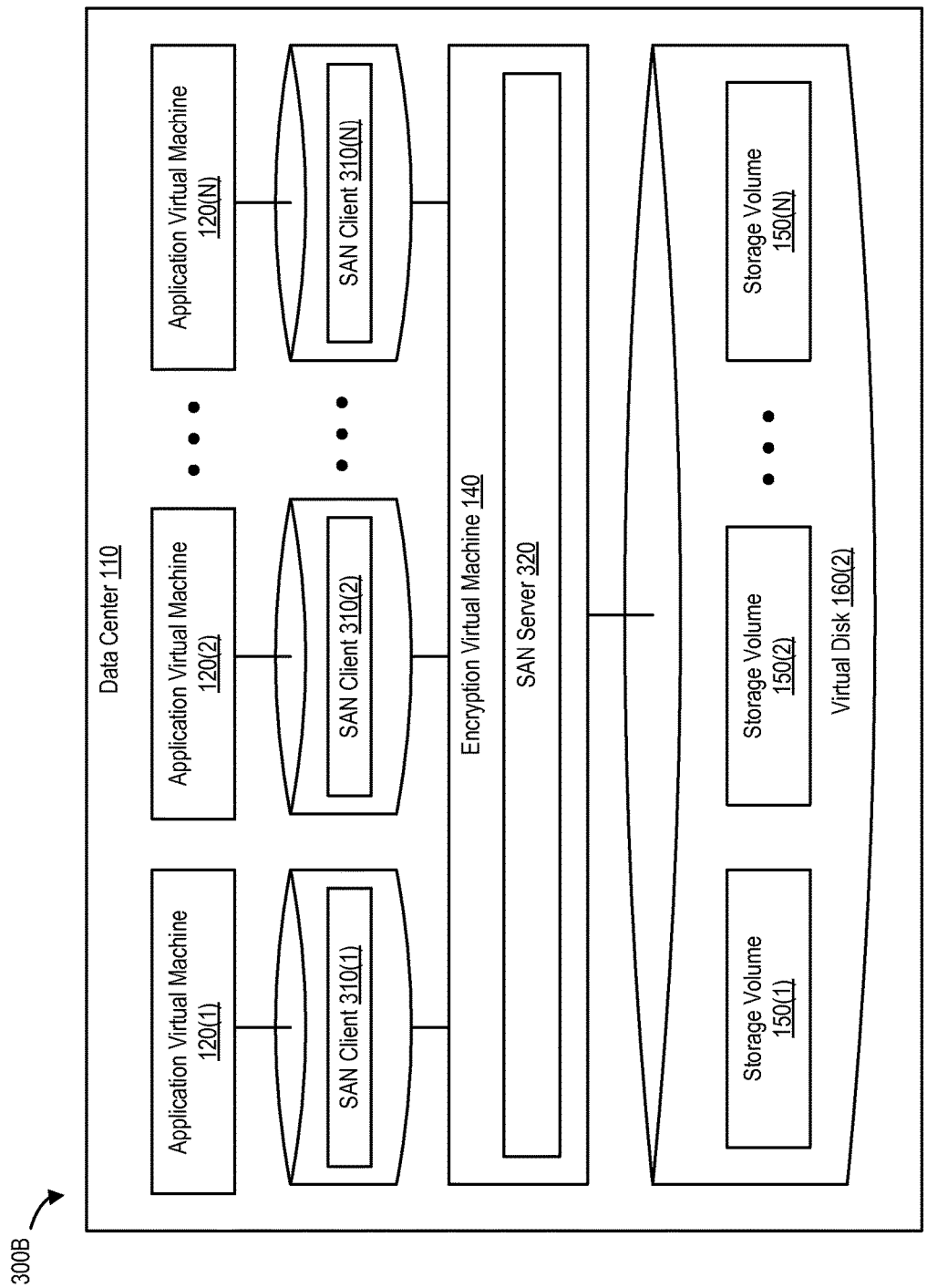
FIG. 3B is a simplified block diagram of a data center that implements a SAN client and a SAN server, according to one embodiment.

FIG. 3B is a simplified block diagram that illustrates virtual disk 160(2) with one or more storage volumes, according to one embodiment. As shown, storage volume 150(1) stores encrypted OS data (e.g., Windows OS 250(1) running on client 220(1) as shown in FIG. 2B) and encrypted application data associated with application virtual machine 120(1), and storage volume 150(2) stores encrypted OS data (e.g., Mac OS 250(2) running on client 220(2) as shown in FIG. 2B) and encrypted application data associated with application virtual machine 120(2). As shown, multiple storage volumes 150(1)-(N) can be stored on virtual disk 160(2) or can be spread out over several other virtual disks (not shown in FIG. 3B).

Booting an Application Virtual Machine

In one embodiment, encryption virtual machine 140 receives a request for requested data. In this example, the requested data is encrypted, and encryption virtual machine 140 is configured to receive the request from an application virtual machine (e.g., application virtual machine 120 as shown in FIG. 1) via a loader (e.g., loader 130 as shown in FIG. 1). The requested data comprises one or more operating system modules.

In some embodiments, the one or more operating system modules can include OS data and/or OS instructions required to boot up a virtual machine. In other embodiments, the OS modules may be part of an OS boot disk. For example, the one or more OS modules may be part of an OS boot disk that can be used to boot up application virtual machine 120 by loader 130 because application virtual machine 120 is an emulation of client 220(1) which runs OS 250. Therefore, the OS modules are configured to be used by application virtual machine 120 (e.g., for the purpose of booting up).

In one embodiment, encryption virtual machine 140 accesses the requested data in a storage volume (e.g., storage volume 150). In this example, storage volume 150 is communicatively coupled (only) to encryption virtual machine 140. The requested data is retrieved from storage volume 150, and the requested data is decrypted at encryption virtual machine 140. Encryption virtual machine 140 then sends the decrypted data to loader 130.

Once encryption virtual machine 140 sends the decrypted data to loader 130, loader 130 can then use the decrypted data to boot up application virtual machine 120. For example, and in one embodiment, SAN client 310(1) can serve application virtual machine 120(1) with the decrypted data sent to loader 130(1) from the SAN target (e.g., SAN server 320). In this example, the decrypted data includes decrypted OS data (e.g., OS modules that are configured to be (and can be) used by application virtual machine 120 as noted above).

Figure 4A:
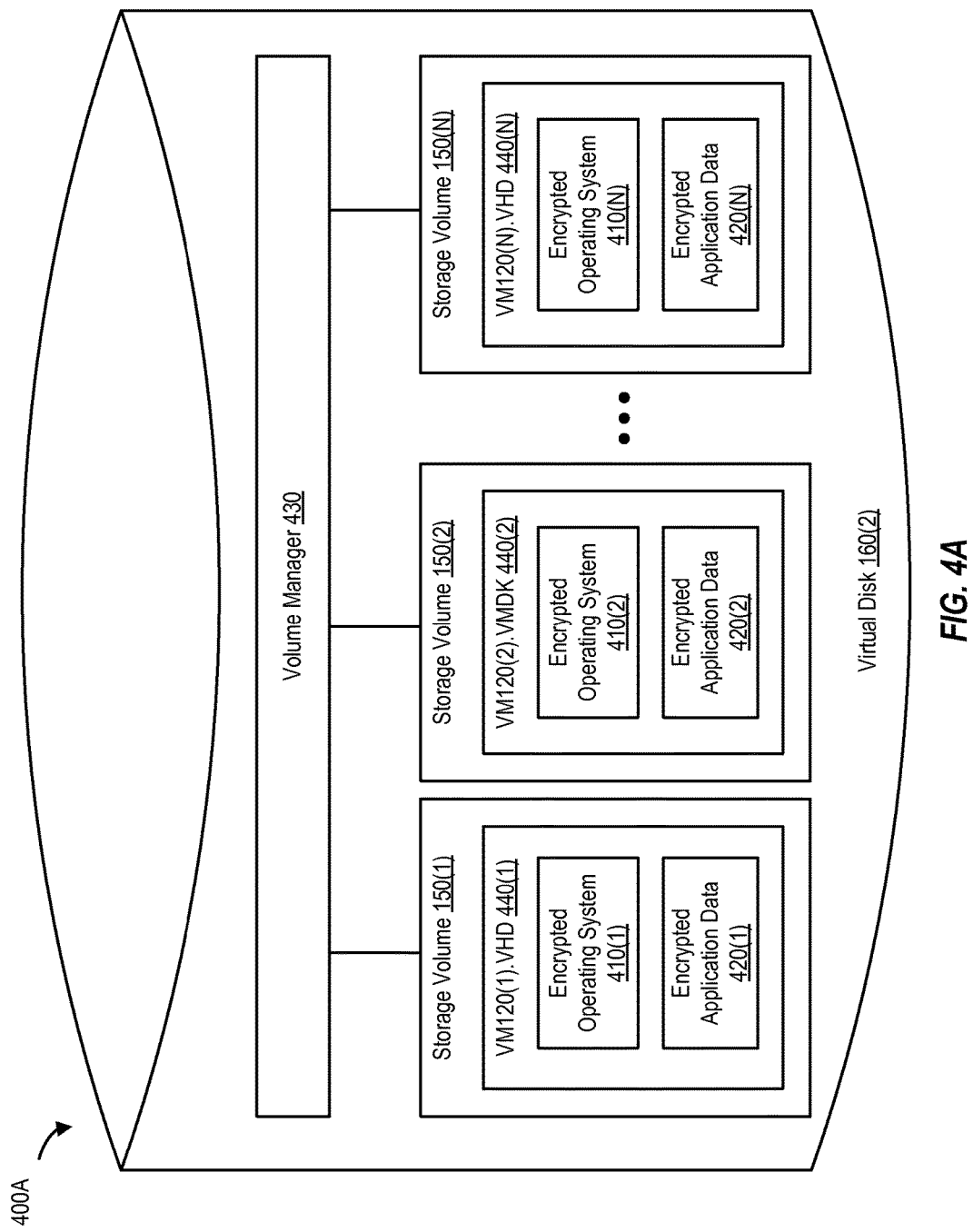
FIG. 4A is a simplified block diagram of one or more storage volumes, according to one embodiment.

FIG. 4A is a simplified block diagram that illustrates the composition of storage volumes 150(1)-(N), according to one embodiment. In this example, each storage volume includes an encrypted OS and encrypted application data. Storage volume 150(1) includes VM120(1).VHD 440(1) which is a file stored in a virtual disk file format. VM120(1).VHD 440(1) includes encrypted OS 410(1) (e.g., Windows OS 250(1)) and encrypted application data 420(1). Encrypted OS 410(1) includes OS modules, OS data, and/or OS instructions requested by application virtual machine 120(1) via loader 130(1). Similarly, storage volume 150(2) includes VM120(2).VMDK 440(2) which is a file stored in another virtual disk file format. VM120(2).VMDK 440(2) includes encrypted OS 410(2) (e.g., Mac OS 250(2)) and encrypted application data 420(2). Encrypted OS 410(2) includes OS modules, OS data, and/or OS instructions requested by application virtual machine 120(2) via loader 130(2).

In one embodiment, storage volumes 150(1)-(N) are managed by volume manager 430, which can be a proprietary volume manager. Although not shown in FIG. 4A, volume manager 430 can also implement and use a proprietary file system. From a data security perspective, volume manager 430 and a file system can be proprietary and can be implemented by the customer who controls encryption virtual machine 140. In this manner, volume manager 430 and the file system can provide additional layers of data security and added protection against hackers (e.g., in addition to the fact that both the OS and application data is encrypted).

Encrypting and Decrypting Data Using an Encryption Virtual Machine

Encryption virtual machine 140 is a dedicated virtual machine which, as noted above, can be created and managed exclusively by a customer (not a vendor). Encryption virtual machine 140 decouples an application virtual machine's storage and can be used to encrypt and decrypt OS data and application data. In one embodiment, encryption virtual machine 140 maintains encryption keys for all application virtual machines in data center 110. In addition, encryption virtual machine 140 also maintains the location of where the encrypted OS data and application data is stored (e.g., in which storage volume, on which virtual disk, etc.).

Figure 4B:
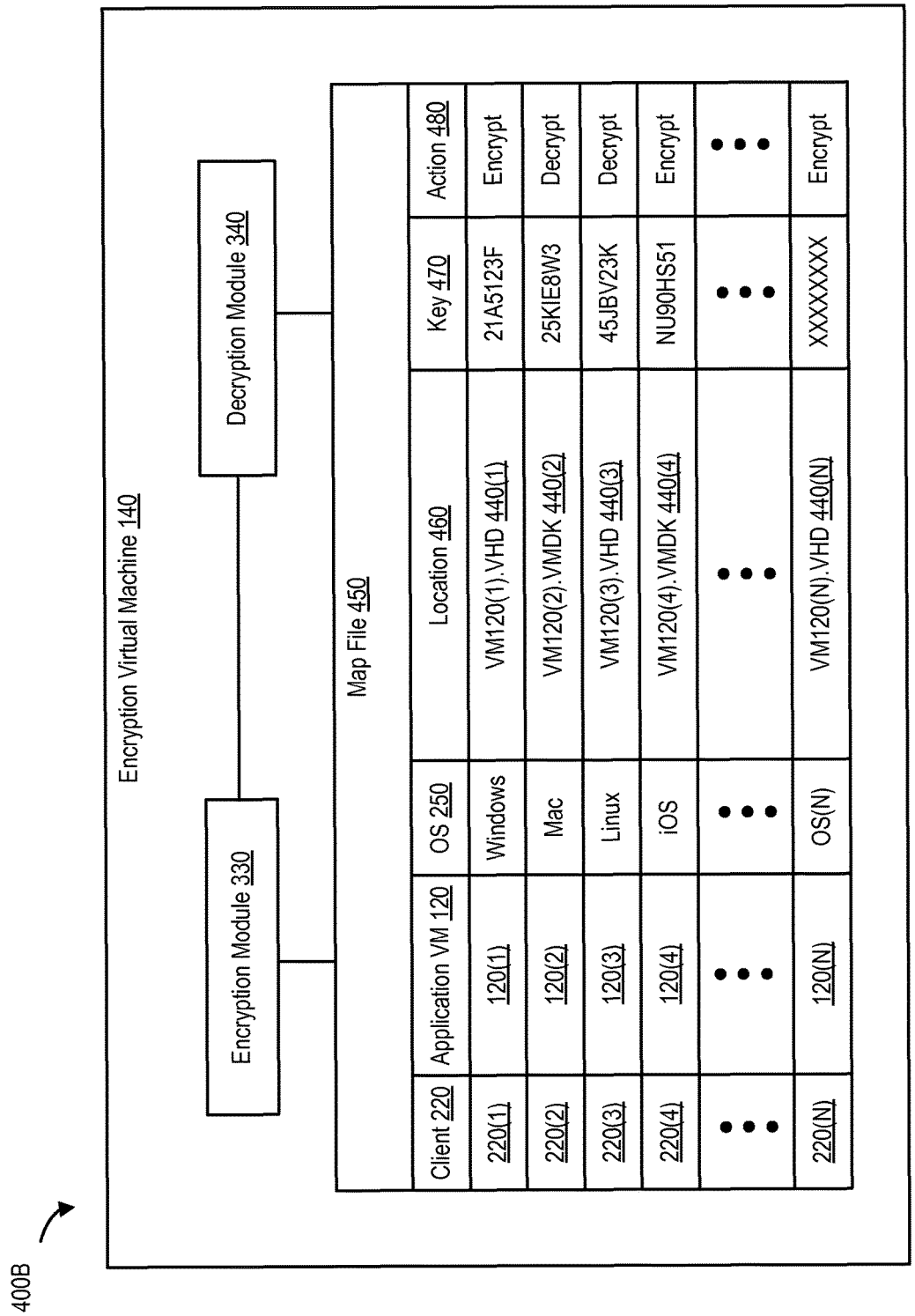
FIG. 4B is a simplified block diagram of a map file used by an encryption virtual machine, according to one embodiment.

FIG. 4B is a simplified block diagram of a map file that can be used to perform data encryption and decryption by encryption virtual machine 140, according to one embodiment. Encryption virtual machine 140 includes encryption module 330 to perform data encryption and decryption module 340 for data decryption (e.g., before sending over requested data to a loader). Map file 450 includes a list of clients 220(1)-(N) that have been emulated into one or more application virtual machines 120(1)-(N) in the cloud (e.g., in data center 110). Map file 450 also maintains information (e.g., in the form of metadata) identifying the OS that each client runs, the location of the OS data, OS modules, and/or OS instructions in a storage volume (e.g., as required to boot up an application virtual machine), an encryption key applicable to each application virtual machine, and an action that is requested by each application virtual machine (e.g., a request for requested data as noted above).

For example, map file 450 notes that client 220(1) is associated with application virtual machine 120(1) and runs Windows OS 250(1). Map file 450 also notes that the OS data (e.g., an encrypted OS as noted in FIG. 4A) is located in storage volume 150(1) on virtual disk 160(2) in file VM120(1).VHD 440(1). In addition, map file 450 maintains an encryption key that encryption virtual machine 140 can use to encrypt and decrypt OS data and/or application data associated with application virtual machine 120(1) (e.g., encryption key 21A5123F).

In some embodiments, map file 450 can be maintained and/or hosted in a web site or using a web service (e.g., on the customer's premise) instead of being stored in encryption virtual machine 140. In this example, encryption virtual machine 140 can request encryption keys from the web site and/or the web service (e.g., instead of referring to the map file locally). Therefore, even if encryption virtual machine 140 is somehow compromised and/or hacked, the customer can still maintain control over the encryption keys and can disable the storage volumes.

As shown in FIG. 4B, application virtual machine 120(1) makes a request for requested data (e.g., OS data for booting up) via loader 130(1). Loader 130(1) then sends this request to encryption virtual machine 140 (e.g., using iSCSI protocol). Encryption virtual machine 140 then accesses map file 450 and locates the requested data in file VM120(1).VHD 440(1). Encryption virtual machine 140 then retrieves encrypted OS 410(1) from storage volume 150(1) and uses encryption key 21A5123F to decrypt encrypted OS 410(1). Encryption virtual machine 140 then sends the decrypted requested data to loader 130(1) (e.g., using iSCSI protocol). Loader 130(1) can then use the decrypted requested data to boot up application virtual machine 120(1). Therefore, encryption virtual machine 140 performs the management of encryption keys and also acts as a SAN target (e.g., by implementing SAN server 320 as shown in FIGS. 3A and 3B). Consequently, even if virtual disk 160(2) and storage volumes 150(1)-(N) are somehow compromised, the data resident on these volumes cannot be deciphered because encryption virtual machine 140 separately manages the encryption and decryption of this data.

It should be noted that in some embodiments, each application virtual machine is coupled to a separate iPXE disk. In other embodiments, multiple application virtual machines can use a single iPXE disk (e.g., a single iPXE disk can implement more than one loader). Although the iPXE disk, as shown, is a virtual disk (e.g., virtual disk 160(1)), in some embodiments, the iPXE disk can be a physical disk as well. The role of the iPXE disk, which acts as an iSCSI client (e.g., SAN client 310), is to identify the application virtual machine which is making the request for the requested data. Based on the request for the requested data from the iPXE disk, encryption virtual machine 140, which acts as an iSCSI target (e.g., SAN server 320), chooses a corresponding encryption key, retrieves the requested data from the correct storage volume (and virtual disk format file), decrypts the requested data, and sends the decrypted data over an iSCSI channel between encryption virtual machine 140 and virtual disk 160(1) (e.g., the iPXE disk/iSCSI client/SAN client). In this manner, both the iPXE disk and the encryption virtual machine decouple one or more application virtual machines from the storage associated with these one or more application virtual machines.

Figure 5:
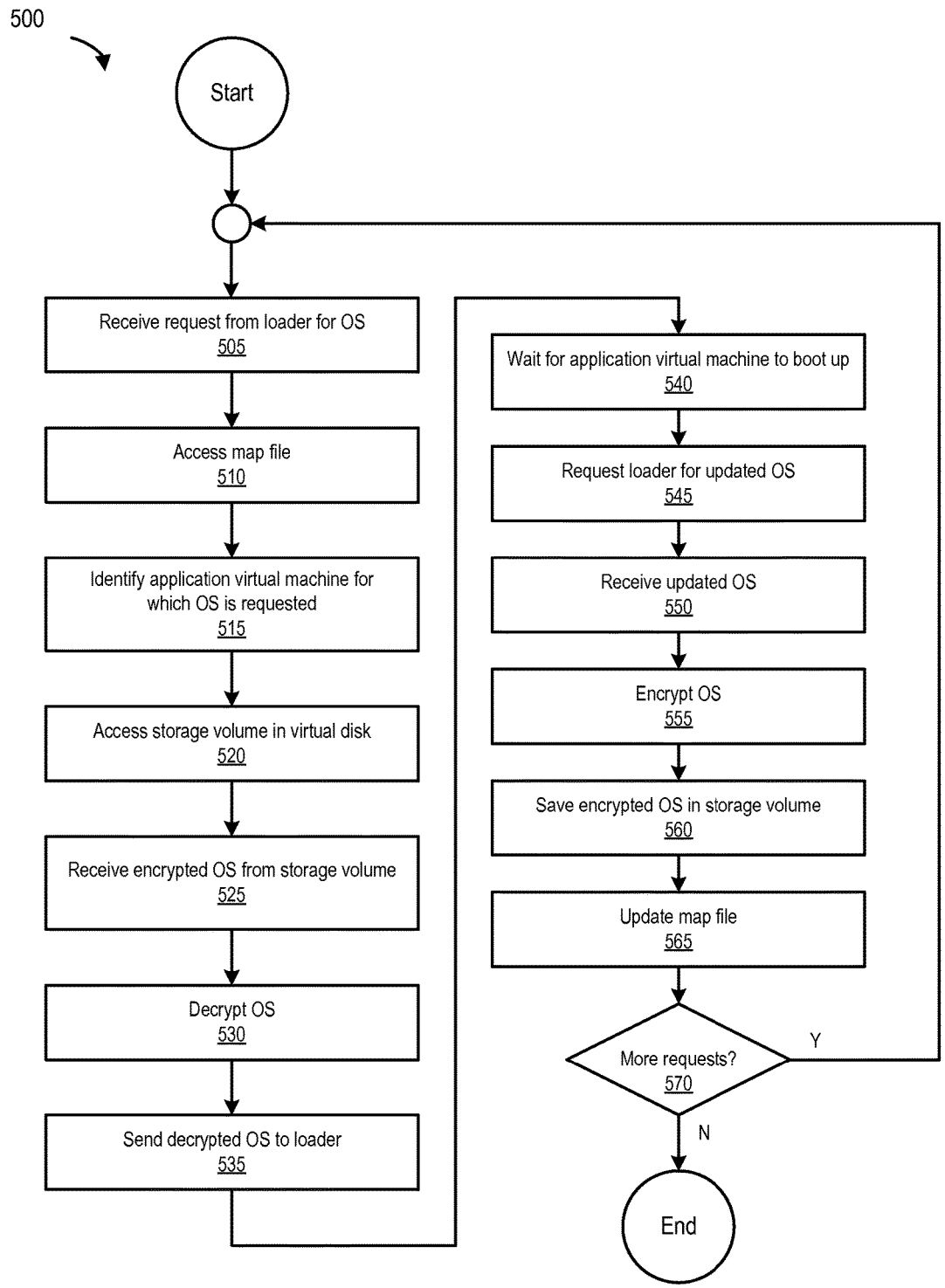
FIG. 5 is a flowchart that illustrates a process for booting an application virtual machine with an encrypted operating system, according to one embodiment.

FIG. 5 is a flowchart that illustrates a process for encrypting and decrypting requested OS data, according to one embodiment. The process begins at 505 by receiving a request (e.g., at encryption virtual machine 140) from a loader for an OS (e.g., encrypted OS 410(1) as shown in FIG. 4A). At 510, the process access a map file (e.g., map file 450 as shown in FIG. 4B). At 515, the application virtual machine for which the OS is requested is identified. In some embodiments, this identification can be performed by the loader (e.g., an iPXE disk) and sent along with the request for the OS to the encryption virtual machine. At 520, the process accesses a storage volume (e.g., storage volume 150) in a virtual disk (e.g., virtual disk 160(2)). At 525, the process receives the encrypted OS (e.g., encrypted OS 410(1) from file VM120(1).VHD 440(1) on storage volume 150(1)). At 530, the process decrypts the retrieved encrypted OS using an encryption key (e.g., key 470 as shown in FIG. 4B). At 535, the process sends the decrypted OS to a loader (e.g., SAN server 320 sends the decrypted OS to SAN client 310 using an iSCSI channel between the iPXE disk and the encryption virtual machine). The loader can then use the decrypted OS to boot the application virtual machine.

The process, at 540, waits for the application virtual machine to boot up, and, at 545, requests the loader for the updated OS (e.g., any changes and/or modifications made to OS data, OS modules, and/or OS instructions by the application virtual machine during and/or after booting up). In some embodiments, the loader can send the updated OS to encryption virtual machine 140 without the encryption virtual machine requesting the updated OS. At 550, the process receives the updated OS. At 555, the process encrypts the OS, and, at 560, saves the encrypted OS in the storage volume. At 565, the process updates the map file. At 570, the process determines if there are any more requests for requested data. If there are no more requests for requested data, the process ends at 570.

Figure 6:
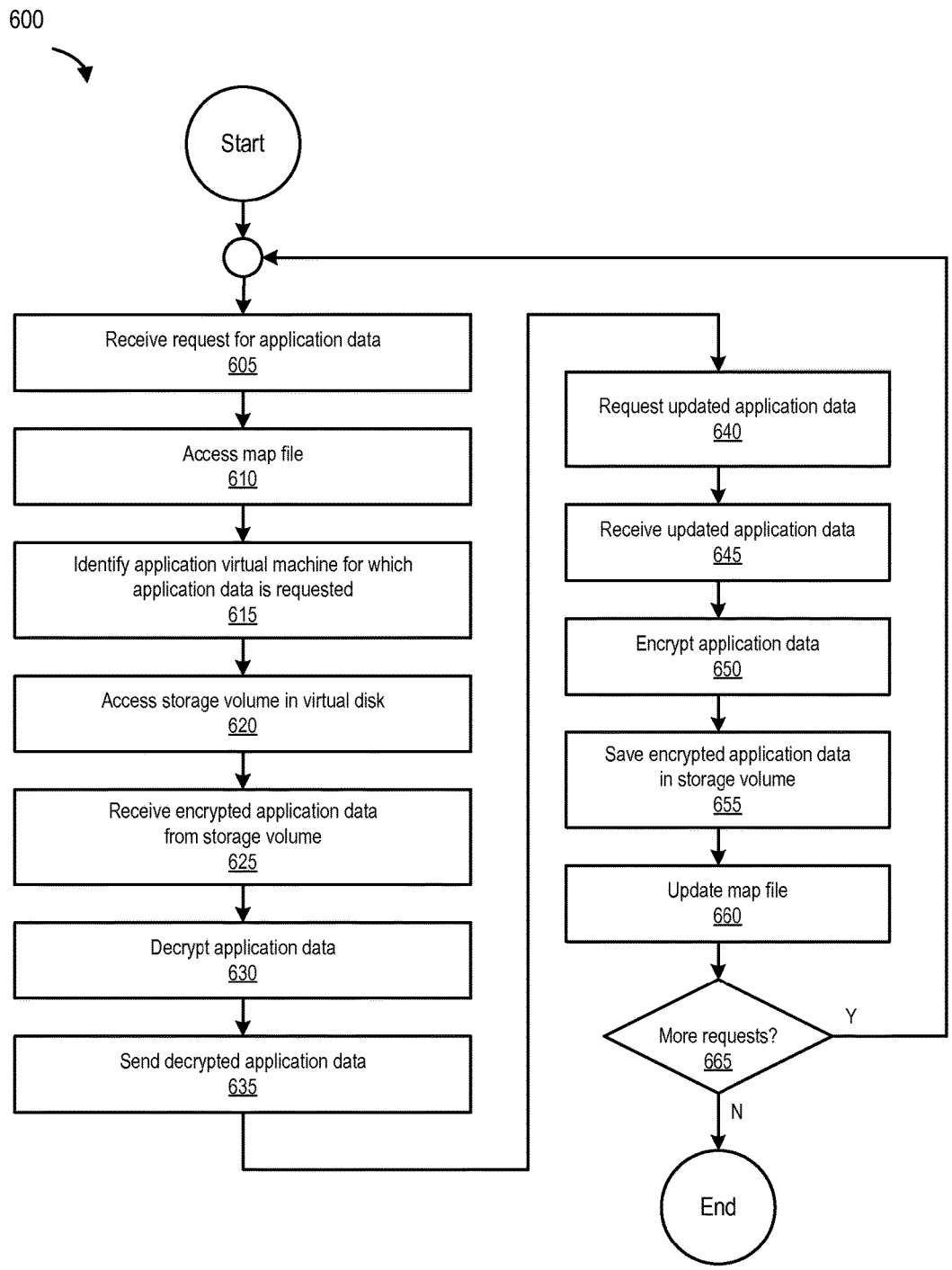
FIG. 6 is a flowchart that illustrates a process for serving encrypted application data to an application virtual machine, according to one embodiment.

FIG. 6 is a flowchart that illustrates a process for encrypting and decrypting requested application data, according to one embodiment. The process begins at 605 by receiving a request (e.g., at encryption virtual machine 140) from a loader for application data (e.g., encrypted application data 420(1) as shown in FIG. 4A). At 610, the process access a map file (e.g., map file 450 as shown in FIG. 4B). At 615, the application virtual machine for which the application data is requested is identified. In some embodiments, this identification can be performed by the loader (e.g., an iPXE disk) and sent along with the request for the application data to the encryption virtual machine. At 620, the process accesses a storage volume (e.g., storage volume 150) in a virtual disk (e.g., virtual disk 160(2)). At 625, the process receives the encrypted application data (e.g., encrypted application data 420(1) from file VM120(1).VHD 440(1) on storage volume 150(1)). At 630, the process decrypts the retrieved encrypted application data using an encryption key (e.g., key 470 as shown in FIG. 4B). At 535, the process sends the decrypted application data to a loader (e.g., SAN server 320 sends the decrypted application data to SAN client 310 using an iSCSI channel or FCoE channel between the iPXE disk and the encryption virtual machine). The loader can then use the decrypted application data to serve the application virtual machine.

The process, at 640, waits for the application virtual machine to change and/or modify the application data in some manner, and, at 645, receives the updated application data (e.g., any changes and/or modifications made to the application data by the application virtual machine during and/or after booting up). In some embodiments, the encryption virtual machine can receive the updated application data directly from the application virtual machine without the intervention of the loader. At 650, the process encrypts the received application data. At 655, the process saves the encrypted application data in the storage volume. At 660, the process updates the map file. At 665, the process determines if there are any more requests for requested data. If there are no more requests for requested data, the process ends at 665.

Figure 7:
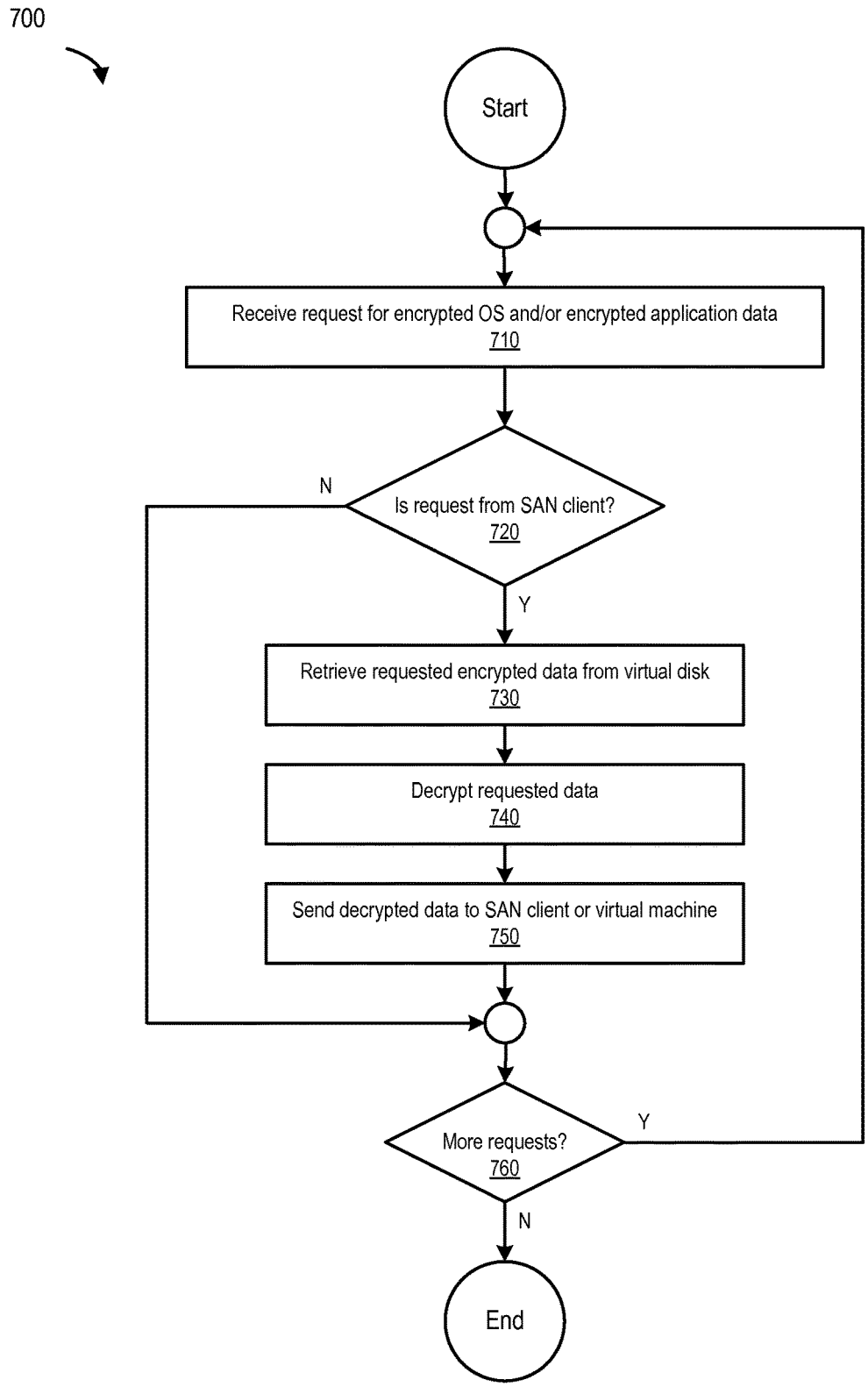
FIG. 7 is a flowchart that illustrates a process for encrypting and decrypting data requested by an application virtual machine, according to one embodiment.

FIG. 7 is a flowchart of a process for decoupling the encryption and storage of virtual machine data, according to one embodiment. The process begins at 710 by receiving a request for encrypted OS data and/or encrypted application data (e.g., the request for requested data received at the encryption virtual machine). At 720, the process determines if the request is from a SAN client (e.g., SAN client 310(1) implemented along with loader 130(1) on virtual disk 160 (1)). In this example, SAN client 310(1) is an iSCSI client if it uses the iSCSI protocol, loader 130(1) is a boot loader, and virtual disk 160(1) an iPXE disk (because loader 130(1) is an iPXE boot loader). In other examples, other combinations of data transfer protocols (e.g., FCoE), clients, targets, virtual disks, physical disks, and/or boot loaders can be implemented (e.g., the iPXE disk can be a physical disk instead of virtual disk 160(1)).

If the request for encrypted OS data and/or encrypted application data is from a SAN client, the process, at 730, retrieves the requested encrypted data (e.g., encrypted OS data and/or encrypted application data) from a virtual disk (e.g., from storage volume 150 on virtual disk 160(2) as shown in FIG. 1). At 740, the process decrypts the requested encrypted data. At 750, the process sends the decrypted data to the SAN client if the decrypted data includes an OS, OS data, OS module(s), and/or OS instructions, or sends the decrypted data directly to one or more application virtual machines if the decrypted data includes only application data. The process ends at 760 if there are no more requests for encrypted data.

It will be appreciated that the encryption virtual machine can be designed, created, implemented, managed, and controlled by a customer (not a vendor). For example, the customer (or some other party) can provide the vendor with an image to be hosted in the cloud (e.g., in data center 110). This image can be used by the customer and/or vendor to create the encryption virtual machine. In some embodiments, any virtual machine operating in data center 110 can be converted into and can be used as the encryption virtual machine. Therefore, it is contemplated that the encryption virtual machine can be distributed in multiple different manners (e.g., the encryption virtual machine can be provided as part of a storage-as-a-service model). In some examples, the encryption virtual machine can be configured to provide high availability and redundancy. More resiliency can also be added to the encryption virtual machine.

In some embodiments, additional measures can be taken to protect the encryption virtual machine itself (e.g., from a hacker). For example, the customer can create and provide a proprietary volume manager and a proprietary file system that sits on top of the storage volumes coupled to the encryption virtual machine. In this manner, different layers of security-based abstraction can be implemented and/or provided to make sure that virtual machine data in the cloud is adequately protected.

Example Computing System

Figure 8:
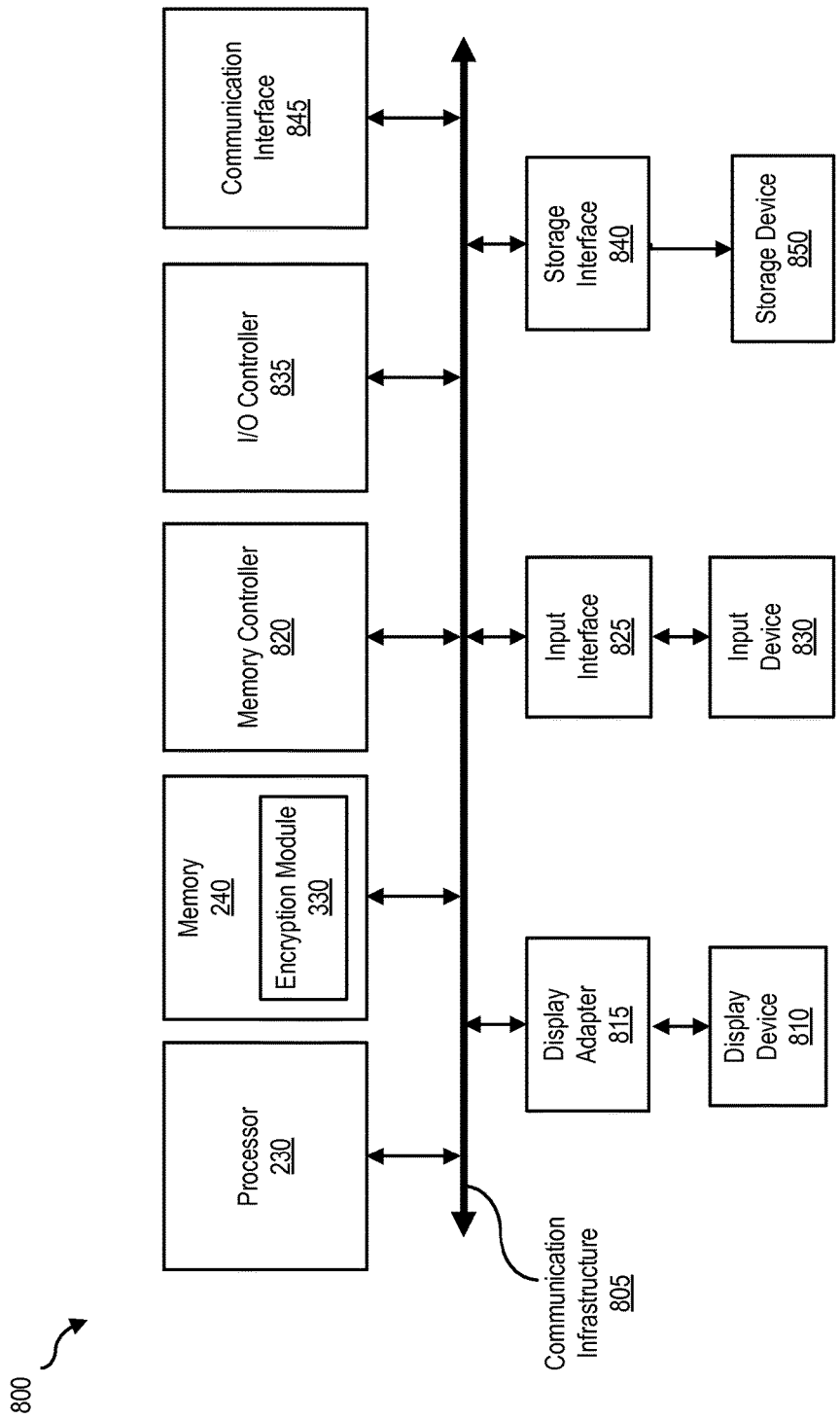
FIG. 8 is a block diagram of a computing device, illustrating how an encryption module can be implemented in software, according to one embodiment.

FIG. 8 is a block diagram of a computing system 800 capable of implementing encryption virtual machine 140 as described above. Computing system 800 broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 230 and a memory 240. By executing the software that implements encryption virtual machine 140, computing system 800 becomes a special purpose computing device that is configured to protect virtual machine data in cloud environments.

Processor 230 generally represents any type or form of processing unit capable of processing data or interpreting and executing instructions. In certain embodiments, processor 230 may receive instructions from a software application or module. These instructions may cause processor 230 to perform the functions of one or more of the embodiments described and/or illustrated herein. For example, processor 230 may perform and/or be a means for performing all or some of the operations described herein. Processor 230 may also perform and/or be a means for performing any other operations, methods, or processes described and/or illustrated herein.

Memory 240 generally represents any type or form of volatile or non-volatile storage device or medium capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing a modifiable volume snapshot operation may be loaded into memory 240.

In certain embodiments, computing system 800 may also include one or more components or elements in addition to processor 230 and memory 240. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type or form of device capable of handling memory or data or controlling communication between one or more components of computing system 800. For example, in certain embodiments memory controller 820 may control communication between processor 230, memory 240, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of a computing device. For example, in certain embodiments I/O controller 835 may control or facilitate transfer of data between one or more elements of computing system 800, such as processor 230, memory 240, communication interface 845, display adapter 815, input interface 825, and storage interface 840.

Communication interface 845 broadly represents any type or form of communication device or adapter capable of facilitating communication between computing system 800 and one or more additional devices. For example, in certain embodiments communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. In at least one embodiment, communication interface 845 may provide a direct connection to a remote server via a direct link to a network, such as the Internet. Communication interface 845 may also indirectly provide such a connection through, for example, a local area network (such as an Ethernet network), a personal area network, a telephone or cable network, a cellular telephone connection, a satellite data connection, or any other suitable connection.

In certain embodiments, communication interface 845 may also represent a host adapter configured to facilitate communication between computing system 800 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing. For example, communication interface 845 may receive instructions from a remote device or send instructions to a remote device for execution.

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810.

As illustrated in FIG. 8, computing system 800 may also include at least one input device 830 coupled to communication infrastructure 805 via an input interface 825. Input device 830 generally represents any type or form of input device capable of providing input, either computer or human generated, to computing system 800. Examples of input device 830 include, without limitation, a keyboard, a pointing device, a speech recognition device, or any other input device.

As illustrated in FIG. 8, computing system 800 may also include storage device 850 to communication infrastructure 805 via a storage interface 840. Storage device 850 generally represents any type or form of storage devices or mediums capable of storing data and/or other computer-readable instructions. For example, storage device 850 may include a virtual disk, a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800.

In certain embodiments, storage device 850 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8.

Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 240 and/or various portions of storage device 850. When executed by processor 230, a computer program loaded into computing system 800 may cause processor 230 to perform and/or be a means for performing the functions of one or more of the embodiments described and/or illustrated herein.

Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

Example Networking Environment

Figure 9:
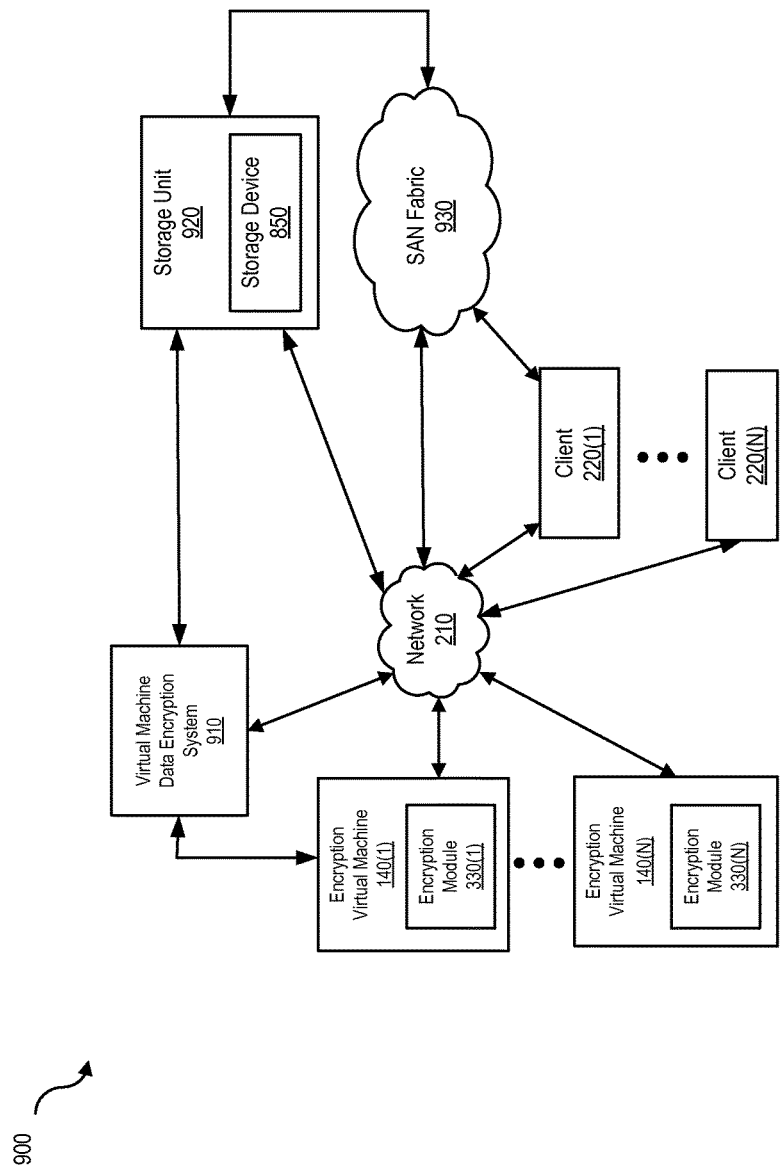
FIG. 9 is a block diagram of a networked system, illustrating how various computing devices can communicate via a network, according to one embodiment.

FIG. 9 is a block diagram of a network architecture 900 in which encryption virtual machine 140 may be coupled to network 210. In certain embodiments, network-attached storage (NAS) devices may be configured to communicate with encryption virtual machine 140 using various protocols, such as Network File System (NFS), Server Message Block (SMB), or Common Internet File System (CIFS).

Network 210 generally represents any type or form of computer network or architecture capable of facilitating communication between multiple computing devices. Network 210 may facilitate communication between encryption virtual machine 140, loader 130, and/or client 220. In certain embodiments, and with reference to computing system 800 of FIG. 8, a communication interface, such as communication interface 845 in FIG. 8, may be used to provide connectivity between encryption virtual machine 140, loader 130, client 220, and network 145. It should be noted that the embodiments described and/or illustrated herein are not limited to the Internet or any particular network-based environment. For example, network 210 can be a Storage Area Network (SAN).

In at least one embodiment, all or a portion of one or more of the embodiments disclosed herein may be encoded as a computer program and loaded onto and executed by encryption virtual machine 140, loader 130, client 220, or any combination thereof. All or a portion of one or more of the embodiments disclosed herein may also be encoded as a computer program, stored in encryption virtual machine 140, loader 130, and/or client 220, and distributed over network 210.

In some examples, all or a portion of the computing devices and/or entities in FIGS. 1, 2A, 2B, 3A, 3B, 4A, and/or 4B may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, encryption module 330 may transform behavior of a virtual machine and/or client in order to cause the virtual machine and/or client to protect encrypted virtual machine data in cloud environments.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
   receiving a request for requested data at an encryption virtual machine, wherein the requested data is encrypted,
      the encryption virtual machine is configured to receive the request from a plurality of application virtual machines via a plurality of loaders, the requested data comprises one or more operating system modules, and the operating system modules are configured to be used by the plurality of application virtual machines;

accessing the requested data in a storage volume, wherein the storage volume is communicatively coupled to the encryption virtual machine, the encryption virtual machine is coupled between the plurality of application virtual machines and the storage volume, the requested data is retrieved from the storage volume, and the requested data is decrypted at the encryption virtual machine; and sending the decrypted data to the plurality of loaders.

2. The method of claim 1, wherein the one or more operating system modules comprise operating system data, and the operating system data is used by a loader of the plurality of loaders to boot an application virtual machine of the plurality of application virtual machines.

3. The method of claim 1, wherein the storage volume is not communicatively coupled to the plurality of application virtual machines.

4. The method of claim 2, wherein the loader implements a Storage Area Network (SAN) client, the encryption virtual machine implements a SAN target, and the SAN client serves the application virtual machine with the decrypted data sent to the loader from the SAN target.

5. The method of claim 2, further comprising:

accessing a map file in the encryption virtual machine prior to accessing the requested data in a storage volume, wherein the map file comprises an encryption key associated with the application virtual machine, the map file maintains a mapping between the application virtual machine and the encryption key associated with the application virtual machine, and the map file comprises a location of the requested data in the storage volume.

6. The method of claim 2, wherein the loader is communicatively coupled to both the application virtual machine and the encryption virtual machine.

7. The method of claim 4, wherein the SAN client uses Internet Small Computer System Interface (iSCSI) protocol to send the request for data to the SAN target; and the SAN target uses the iSCSI protocol to send the decrypted data to the SAN client.

8. The method of claim 2, wherein the loader is implemented in a virtual disk, the loader is a boot loader, and the virtual disk is an iPXE disk.

9. A non-transitory computer readable storage medium comprising program instructions executable to:

receive a request for requested data at an encryption virtual machine, wherein the requested data is encrypted, the encryption virtual machine is configured to receive the request from a plurality of application virtual machines via a plurality of loaders, the requested data comprises one or more operating system modules, and the operating system modules are configured to be used by the plurality of application virtual machines;

access the requested data in a storage volume, wherein the storage volume is communicatively coupled to the encryption virtual machine, the encryption virtual machine is coupled between the plurality of application virtual machines and the storage volume, the requested data is retrieved from the storage volume, and the requested data is decrypted at the encryption virtual machine; and send the decrypted data to the plurality of loaders.

10. The non-transitory computer readable storage medium of claim 9, wherein the one or more operating system modules comprise operating system data, and the operating system data is used by a loader of the plurality of loaders to boot an application virtual machine of the plurality of application virtual machines, and the storage volume is not communicatively coupled to the application virtual machine.

11. The non-transitory computer readable storage medium of claim 10, wherein the loader implements a Storage Area Network (SAN) client, the encryption virtual machine implements a SAN target, the SAN client serves the application virtual machine with the decrypted data sent to the loader from the SAN target, the SAN client uses Internet Small Computer System Interface (iSCSI) protocol to send the request for data to the SAN target; and the SAN target uses the iSCSI protocol to send the decrypted data to the SAN client.

12. The non-transitory computer readable storage medium of claim 10, further comprising:

accessing a map file in the encryption virtual machine prior to accessing the requested data in a storage volume, wherein the map file comprises an encryption key associated with the application virtual machine, the map file maintains a mapping between the application virtual machine and the encryption key associated with the application virtual machine, and the map file comprises a location of the requested data in the storage volume.

13. The non-transitory computer readable storage medium of claim 10, wherein the loader is communicatively coupled to both the application virtual machine and the encryption virtual machine.

14. The non-transitory computer readable storage medium of claim 10, wherein the loader is implemented in a virtual disk, the loader is a boot loader, and the virtual disk is an iPXE disk.

15. A system comprising:

one or more hardware processors; and a memory coupled to the one or more hardware processors, wherein the memory stores program instructions executable by the one or more hardware processors to:

receive a request for requested data at an encryption virtual machine, wherein the requested data is encrypted, the encryption virtual machine is configured to receive the request from a plurality of application virtual machines via a plurality of loaders, the requested data comprises one or more operating system modules, and the operating system modules are configured to be used by the plurality of application virtual machines;

access the requested data in a storage volume, wherein the storage volume is communicatively coupled to the encryption virtual machine, the encryption virtual machine is coupled between the plurality of application virtual machines and the storage volume, the requested data is retrieved from the storage volume, and the requested data is decrypted at the encryption virtual machine; and send the decrypted data to the plurality of loaders.

16. The system of claim 15, wherein the one or more operating system modules comprise operating system data, and the operating system data is used by a loader of the plurality of loaders to boot an application virtual machine of the plurality of application virtual machines, and the storage volume is not communicatively coupled to the application virtual machine.

17. The system of claim 16, wherein the loader implements a Storage Area Network (SAN) client, the encryption virtual machine implements a SAN target, the SAN client serves the application virtual machine with the decrypted data sent to the loader from the SAN target, the SAN client uses Internet Small Computer System Interface (iSCSI) protocol to send the request for data to the SAN target; and the SAN target uses the iSCSI protocol to send the decrypted data to the SAN client.

18. The system of claim 16, further comprising:

accessing a map file in the encryption virtual machine prior to accessing the requested data in a storage volume, wherein the map file comprises an encryption key associated with the application virtual machine, the map file maintains a mapping between the application virtual machine and the encryption key associated with the application virtual machine, and the map file comprises a location of the requested data in the storage volume.

19. The system of claim 16, wherein the loader is communicatively coupled to both the application virtual machine and the encryption virtual machine.

20. The system of claim 16, wherein the loader is implemented in a virtual disk, the loader is a boot loader, and the virtual disk is an iPXE disk.

\* \* \* \* \*